United States Patent
Vishal

(10) Patent No.: US 10,938,797 B2
(45) Date of Patent: Mar. 2, 2021

(54) CUSTOMIZED EXPAND DATA SERVICES SUPPORTING DELTA QUERYING

(71) Applicant: SAP SE, Walldorf (DE)

(72) Inventor: Vivek Vishal, Bangalore (IN)

(73) Assignee: SAP SE, Walldorf (DE)

( * ) Notice: Subject to any disclaimer, the term of this patent is extended or adjusted under 35 U.S.C. 154(b) by 834 days.

(21) Appl. No.: 15/200,336

(22) Filed: Jul. 1, 2016

(65) Prior Publication Data

US 2018/0004830 A1 Jan. 4, 2018

(51) Int. Cl.
*H04L 29/06* (2006.01)
*G06F 21/62* (2013.01)

(52) U.S. Cl.
CPC .......... *H04L 63/08* (2013.01); *G06F 21/6218* (2013.01)

(58) Field of Classification Search
CPC .............................. H04L 63/08; G06F 21/6218
See application file for complete search history.

(56) References Cited

U.S. PATENT DOCUMENTS

| | | | |
|---|---|---|---|
| 7,720,845 B2 | 5/2010 | Stata et al. | |
| 8,924,848 B2 | 12/2014 | Klinger | |
| 9,043,319 B1 * | 5/2015 | Burns ............... | G06F 16/24578 707/725 |
| 9,208,244 B2 | 12/2015 | James et al. | |
| 2002/0073092 A1 * | 6/2002 | Nally ...................... | G06F 9/466 707/999.1 |
| 2002/0116396 A1 * | 8/2002 | Somers .................... | G06F 16/27 707/999.2 |
| 2003/0191747 A1 * | 10/2003 | Espino ................... | G06F 16/957 |
| 2005/0091198 A1 * | 4/2005 | Dettinger ............. | G06F 16/3338 707/999.003 |
| 2008/0307010 A1 | 12/2008 | Cullison et al. | |
| 2014/0280691 A1 * | 9/2014 | Buemer .................. | H04L 67/02 709/217 |
| 2015/0142855 A1 * | 5/2015 | Fast ........................ | H04L 67/10 707/803 |
| 2015/0186446 A1 | 7/2015 | Burkett et al. | |
| 2016/0021209 A1 | 1/2016 | Lacasse et al. | |

* cited by examiner

*Primary Examiner* — Kannan Shanmugasundaram
(74) *Attorney, Agent, or Firm* — Buckley, Maschoff & Talwalkar LLC

(57) ABSTRACT

An application is developed and built through a development platform. The application provides a user interface to serve user requests. The application provides expanded set of data entities stored at a back-end application. The application communicates with the development platform to request data from the back-end application. The development platform communicates with the back-end application through sending and receiving communication messages with a connection server. The expand data services are implemented on the connection server to access and provide data associated with a requested data entity. The provided data expand services are also serving delta data requests associated with updates on the back-end application. The delta data is related to a previous data download request at the back-end application. The provided data expand services, which support delta data querying, are utilized during initial data loading of the application.

22 Claims, 11 Drawing Sheets

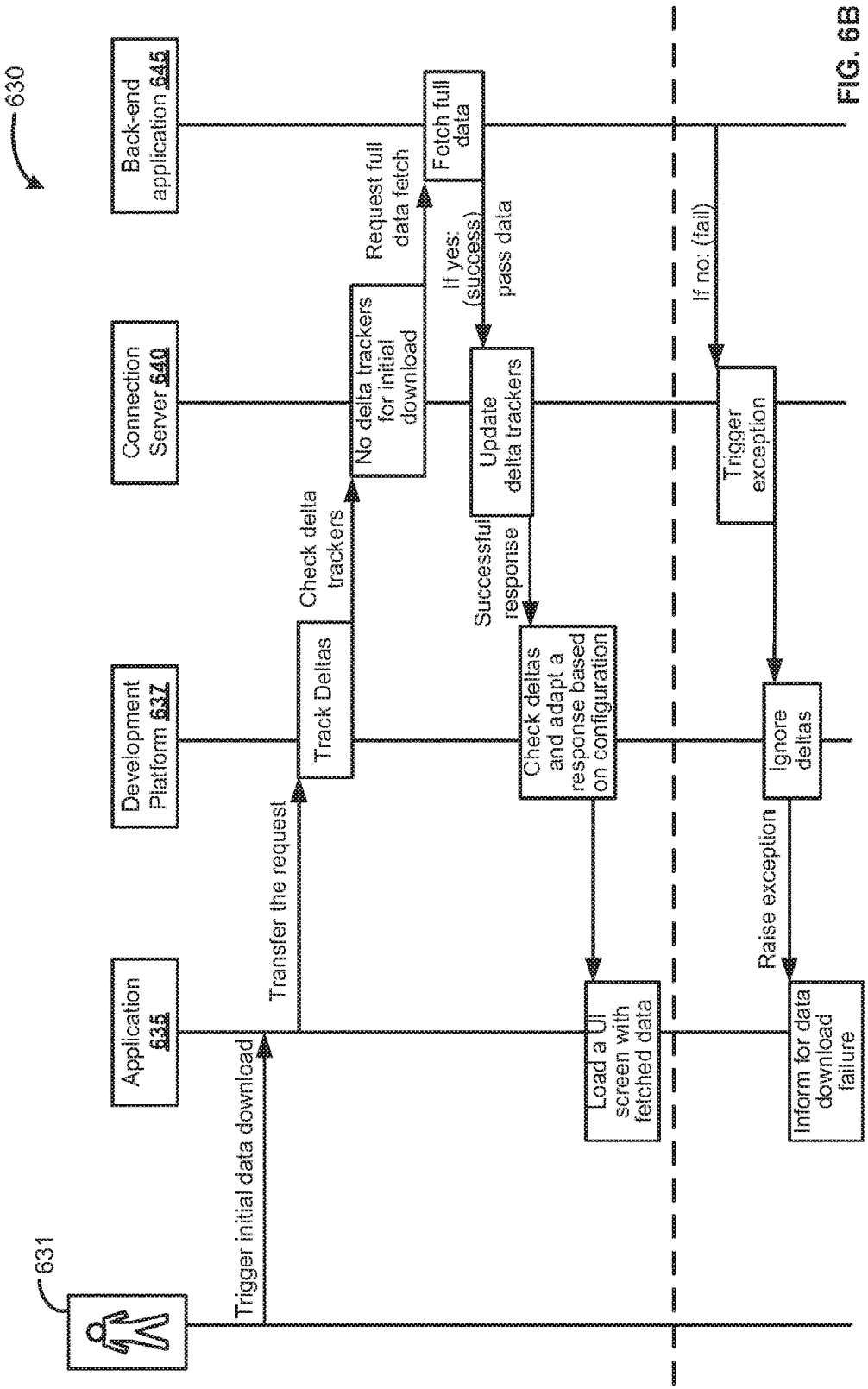

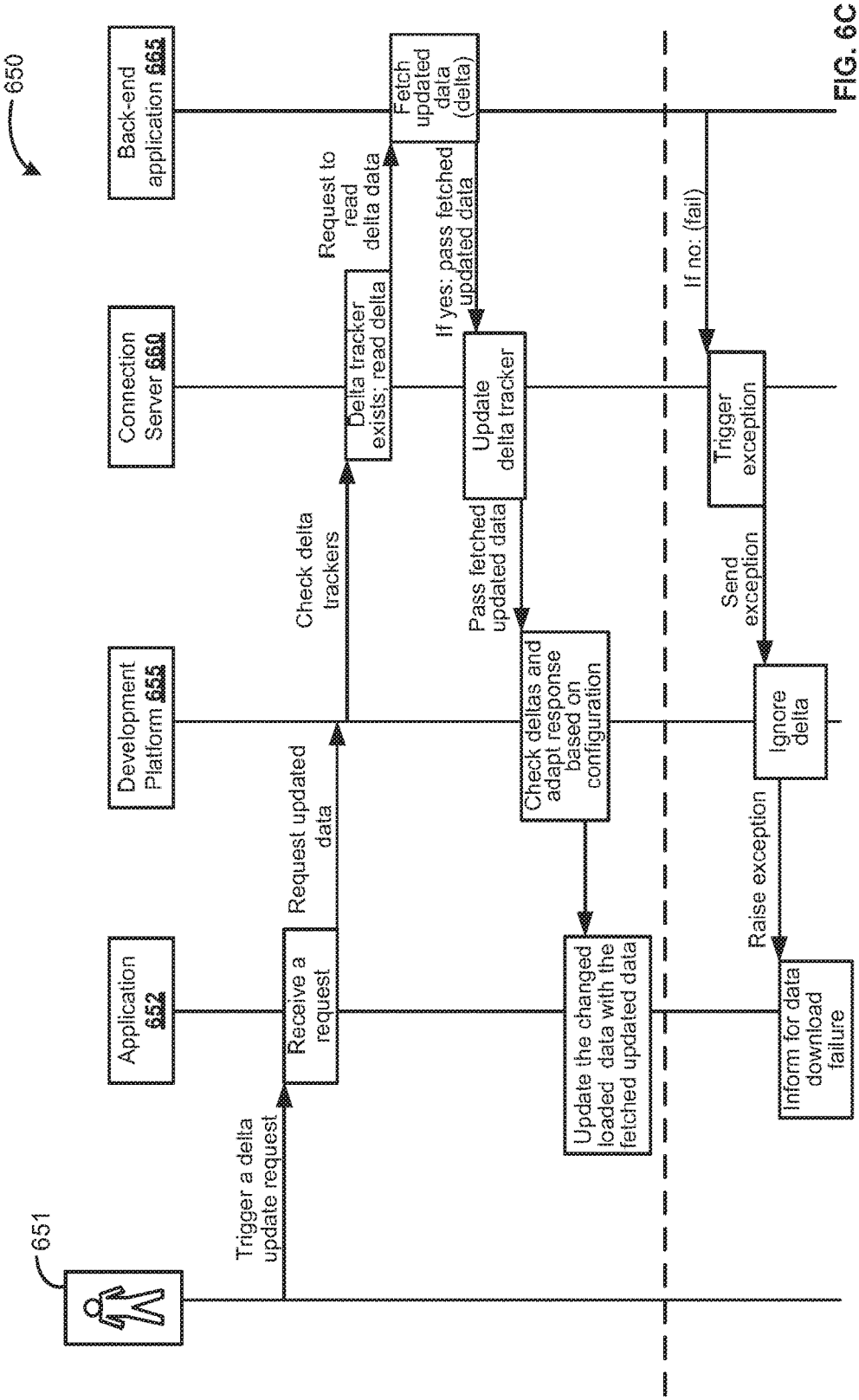

CUSTOMIZED EXPAND DATA SERVICES SUPPORTING DELTA QUERYING

BACKGROUND

Software complexity is increasing and is resulting in changes in product cycles, requirements, and modes for delivering software applications. Software applications can adopt or get access to different services and capabilities from other software offerings. For example, they may consume resources and functionality provided by computing platforms, such as on-premise platforms, cloud platforms, mobile platforms, etc. Development platforms are used for building and deploying applications. Development platforms may support applications' lifecycle to provide different scenarios, such as business-to-enterprise and/or business-to-customer. Development platforms may interact with applications and provide services, which are consumed by end users. For example, the applications may be mobile applications. The applications may be installed on different devices, as mobile phones, tablets, etc. Development platforms may assist in balancing device user requirements and enterprise requirements when building applications. Mobile applications, when installed on devices, communicate through a network connection with a back-end system. The back-end system may include databases and implementation logic for providing resources.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 6B is a flow diagram illustrating a process for initial data download for a mobile application related to a back-end application through a connection server, which is providing delta expand services, according to one embodiment.

FIG. 6C is a flow diagram illustrating a process for delta data requests between a mobile application and a back-end application through a connection server, which provides delta expand services, according to one embodiment.

DETAILED DESCRIPTION

Embodiments of techniques for providing customized expand data services supporting delta data querying are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
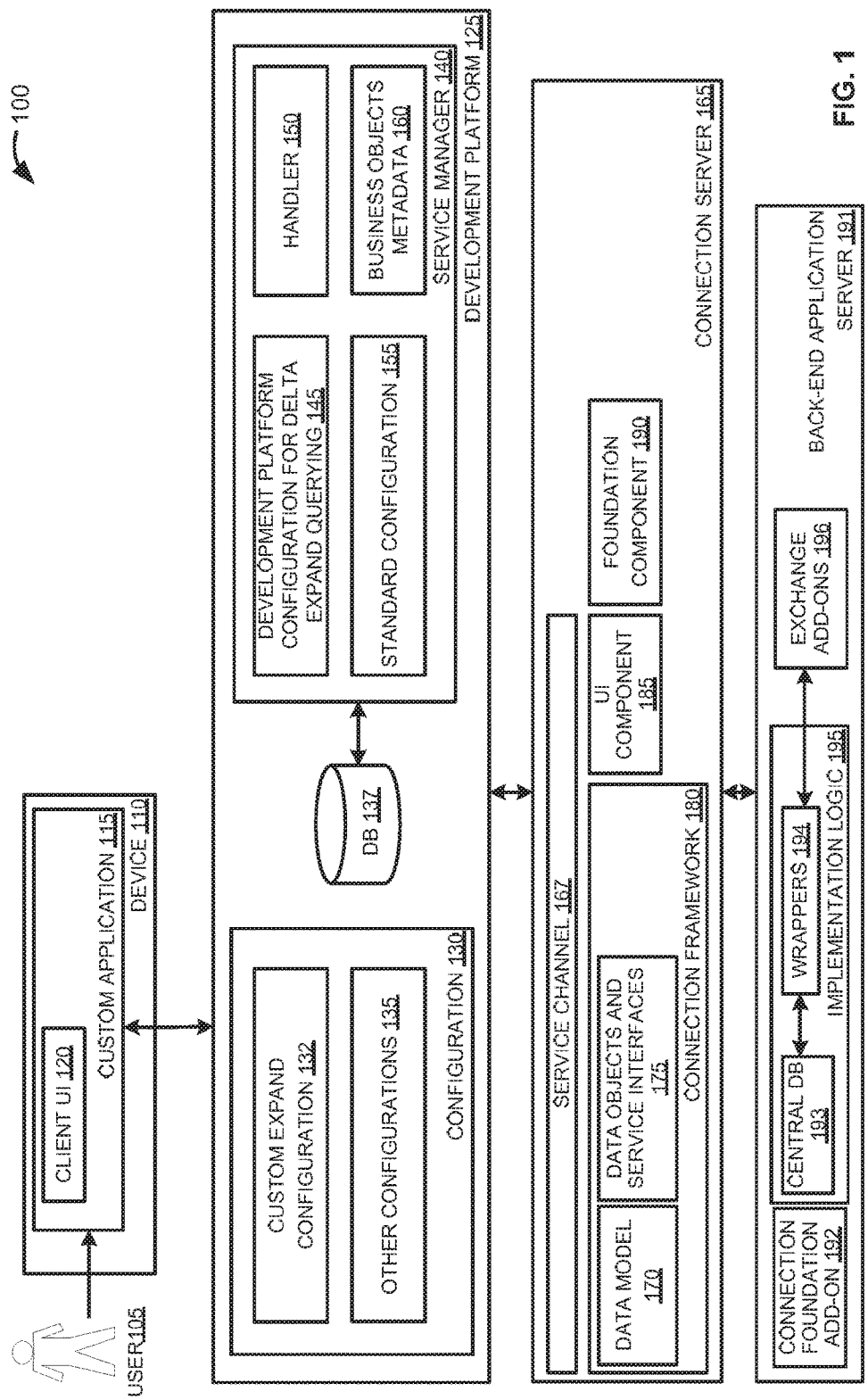
FIG. 1 is a block diagram illustrating an exemplary system environment for providing expand services supporting delta querying, according to one embodiment.

FIG. 1 is a block diagram illustrating an exemplary system environment 100 for providing expand services supporting delta querying, according to one embodiment. A custom application 115 is installed on a device 110. The custom application provides functionality for consumption by a user 105. The custom application 115 includes a client user interface (UI) 120. The user 105 interacts with the custom application 115 through the client UI 120. The client UI 120 provides options for defining request associated with data maintained at a back-end application, such as data stored the back-end application server 191. The client UI 120 may present data acquired from the back-end application server 191. The requests that may be received at the client UI 120 may be requests for initial data download. The initial data download requests may be requests for expanded data related to a defined data entity. The initial data download requests may be defined through a search function definition. The requests may be received at the client UI 120 and may also be related to providing delta updated data, already presented at the client UI 120. The requested delta updated data may be defined as updated expanded data related to previously provided expanded data.

In one embodiment, the custom application 115 resends requests to the development platform 125, when the user 105 requests data from the back-end application server 191. The development platform 125 includes configuration 130 and a service manager 140. The configuration 130 includes a custom expand configuration 132 and other configurations 135. The custom expand configuration 132 is related to providing data through expand services and/or other custom services to applications, connected to the development platform 125. The expand services may combine output response including several associated entities into a single response objects. In such manner, the communication is enhanced and the total number of communication calls for acquiring the data is reduced. For example, the custom expand configuration 132 is used for handling requests for providing expanded data persisted at the back-end application server 191. The configurations 130 on the development platform 125 include different configurations for platform-provided services. These configurations may be provided for different services. The service manager 140 is connected with a DB 137. The DB 137 is a local database for storing application specific metadata and functional data that include temporary data related to applications connected to the development platform 125. The service manager 140 includes a handler 150, business objects metadata 160, a standard configuration 155, and a custom delta service configuration 145. The handler 150 processes requests and responses to the custom application 115. The standard configuration 155 includes configuration for standard set of services provided through the development platform, which may be consumed by applications. The standard configuration 155 may be used in cases where the custom application 115 requests a standard service from the development platform 125. The custom delta service configuration 145 is a configuration, defined for an instantiated delta expand data service for providing expanded data and providing delta updated for the expanded data. The delta expand data service is instantiated at a connection server 165, which directly communicates with the back-end application server 191. Requests from the custom application 115 to the development platform 125 associated with providing expand data services are controlled by the custom delta service configuration 145. The custom delta service configuration 145 is related to controlling the configuration of the responses sent to the custom application 115 through the custom expand configuration 132. The Delta Expand Services is an enhancement on an expand service, where only a subset of data is fetched. Through fetching delta updated data, the performance of the delta expand service is improved with respect to time and communication latency. Updated data from a previous cycle of data requests is read, instead of reading all the data for every data request.

The business objects metadata 160 includes metadata for business object related to provided services through the development platform 125. The business objects metadata 160 includes business logic, operations, attributes and relationships associated with the custom application 115. The business object metadata 160 is also connected with the DB 137. The business objects metadata 160 includes business rules and logic for execution of scenarios related to requesting local data from the DB 137. The requested local data may be associated with transferring a data request received at the development platform 125 to the connection server 165.

When a request from the custom application 115 is received at the development platform 125 for expanded sets of data entities, the development platform 125 handles the request through the handler 150, and communicates with the connection server 165 via a service channel 167. The service channel 167 supports a network protocol for establishing connection and exchanges messages. The connection server 165 includes a connection framework 180 to handle communication between the development platform and the back-end application server 191. The connection framework 180 includes a data model 170. The data model 170 includes models, which are defined with metadata definitions and define different attributes. The connection framework 180 also includes implementation of the expand data service included in data objects and service interfaces 175. The expand data service supports delta querying. The delta querying may be performed and delta tokens may be generated to assist the process of delta querying. For example, the delta tokens may assist in identifying whether requests are performed successfully or unsuccessfully. The connection server 165 also includes a UI component 185 and a foundation component 190. The UI component 185 and the foundation component 190 are associated with the implementation of application and data services, including the expand data service providing delta querying. The foundation component 190 may be utilized to create a data model, to be stored in the data model 170. The created data model may be used for implementing a service according to the model. Further, the foundation component 190 assists in hosting the expand data service.

The connection server 165 communicates with the back-end application server 191 to provide the requested data from the custom application 115 through the instantiated expand data service. The back end application server 191 may be a business enterprise application or a management software. The back-end application server 191 may be an Enterprise Resource Planning (ERP) system. The back-end application server 191 includes a data storage, such as a central database (DB) 193, where data of different type is stored and organized according to data schemas. The back-end application server 191 maintains implementation logic 195, which may be invoked to provide functionality to users interacting with the client UI 120. The invocation of data from the central DB 193 may be performed through wrappers 194. The back-end application server 191 includes a connection foundation add-on 192, which interacts with the foundation component 190 from the connection server 165 while providing expanded data requested from the custom application 115. The back-end application server 191 further includes exchange add-ons 196. The exchange add-ons 196 are functional add-ons that enable different business processes to be performed through the custom application 115.

Figure 2:
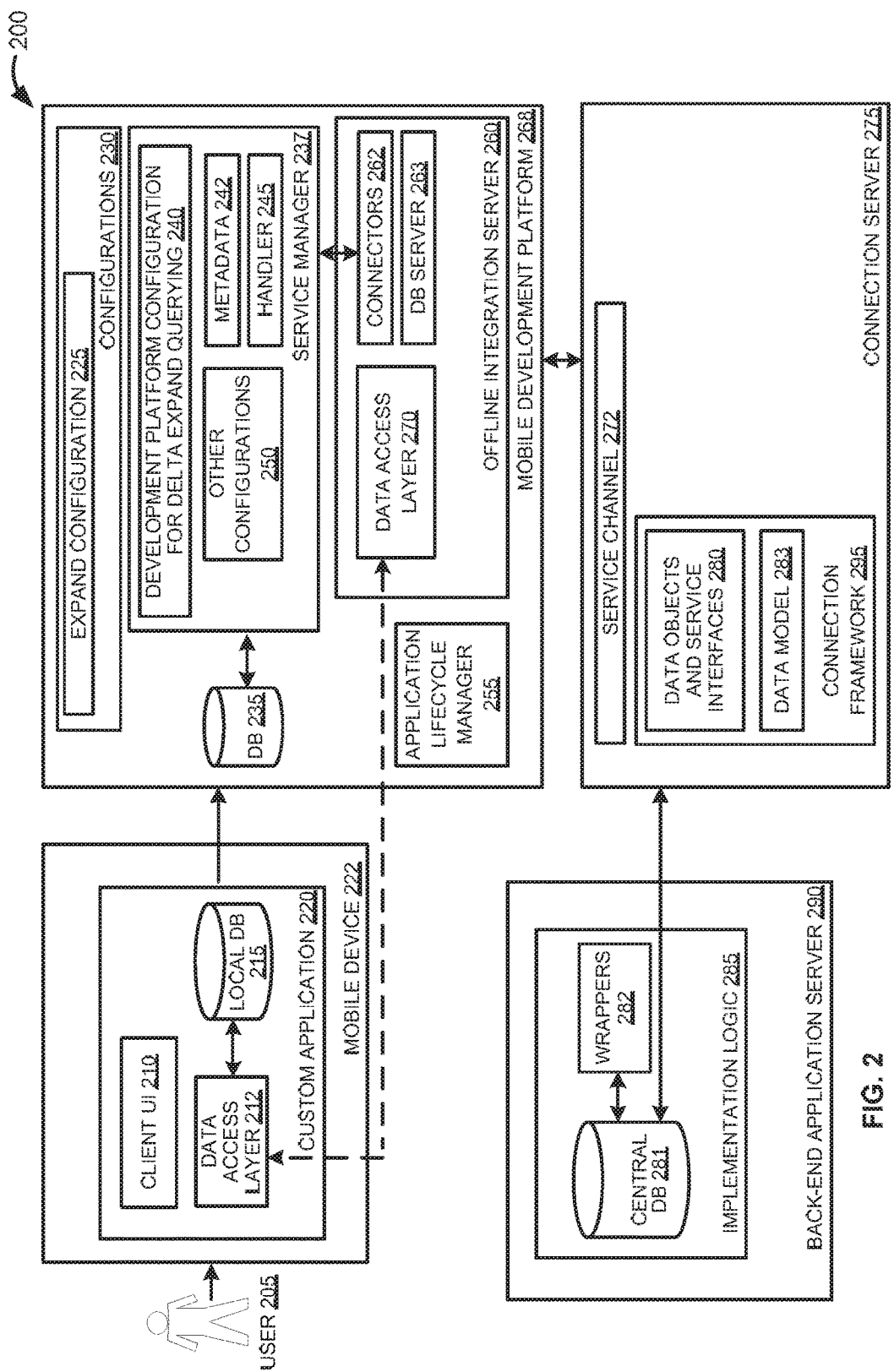
FIG. 2 is a block diagram illustrating an exemplary system environment supporting offline and online data synchronization and providing expand services for delta querying, according to one embodiment.

FIG. 2 is a block diagram illustrating an exemplary system environment supporting offline and online data synchronization and providing expand services for delta querying, according to one embodiment. FIG. 2 may correspond to FIG. 1. A custom application 220 is used for requesting data from a back-end application server 290. The requests, which are served by the custom application 220, may include requests for expanded data sets defined through a search criteria and may also include delta data requests associated with previously provided expanded data sets. The custom application 220 may correspond to the custom application 115 discussed in relation to FIG. 1. The custom application 220 is a mobile application installed on a mobile device 222. The custom application 220 may communicate with a mobile development platform 268 to access data stored at a back-end application. The custom application 220 may support offline and online scenarios for providing data services. The custom application 220 includes client UI 210 and data access layer 212. The mobile development platform 268 includes configurations 230, a service manager 237, a DB 235, an application lifecycle manager 255, and the offline integration server 260. The configurations 230 may correspond to the configuration 130. The configurations 230 include expand configuration 225, which correspond to the custom expand configuration 132.

The data access layer 212 of the custom application 220 is associated with a local database 215, which stored local data. In an offline mode, the custom application 220 may provide the data from the local database 215 to the user 205. The user 205 may perform changes and additions to the provided data in the offline mode. When the custom application 220 enters into an online mode, the pushed data from the user 205 in the offline scenario may be pushed back to the back-end application server 290. The back-end application server 290 includes implementation logic 285 corresponding to provide functionality. The implementation logic 285 includes logic and functionality for storing data in a central DB 281. The implementation logic 285 further includes logic for defining wrappers 282 to communicate with the central DB 281 and to push and invoke data according to defined data schemas and models. The pushing of data from the custom application 220 may be requested through the mobile development platform 268. The mobile development platform 268 connects with the connection server 275 to provide the data to the back-end application server 290. The data access layer 212 sends requests to the data access layer 270 at the offline integration server 260, when an offline request is send to the mobile development platform 268.

The offline integration server 260 includes the data access layer 270, connectors 262, and a DB server 263. The offline integration server 260 is accessed when offline requests are received. The data access layer 270 receives the requests and through the connectors 262 communicates with the service manager 237. The offline integration server 260 includes a DB server 263, which communicates with the connectors 262 and the data access layer 270. The connectors 262 determine whether data is requested in an offline or online scenario and establishes connections with the service manager 237. The DB server 263 may store fetched data from the back-end application server 290, which data is provided through the service manager 237. The service manager 237 may correspond to the service manager 140 discuss in relation to FIG. 1. The delta service configuration 240 may correspond to the custom delta service configuration 145, FIG. 1. Other configurations 250 may correspond to the standard configuration 155, FIG. 1. The metadata 242 may be similar to the business object metadata 160, FIG. 1. The handler 245 may correspond to the handler 150, FIG. 1. The application lifecycle manager 255 may take care of the lifecycle of application, such as the custom application 220, which are generated in the mobile development platform 268. The application lifecycle manager 255 maintains details about user interactions and consumed services provided through the mobile development platform 268.

The mobile development platform 268 communicates with the connection server 275. The communication between the mobile development platform 268 and the connection server 275 may be performed through a service channel 272. The service channel 272 may correspond to a type of connection that is supported by the connection server 275. The communication between the mobile development platform 268 and the connection server 275 may be for transferring requests for expanded data sets received from the custom application 220 and forwarded to the back-end application server 290. The connection server 275 and the back-end application server 290 may correspond to the described connection server 165 and the back-end application server 191 in relation to FIG. 1. The connection server 275 includes a connection framework 295, which may correspond to the connection framework 180, FIG. 1. The connection framework 295 includes a data model 283 for defining data structures with attributes, and also includes data objects and service interfaces 280, associated with the data model 283. The data objects and service interfaces 280 includes instantiated services for providing expanded sets of data from the back-end application server 290.

Figure 3:
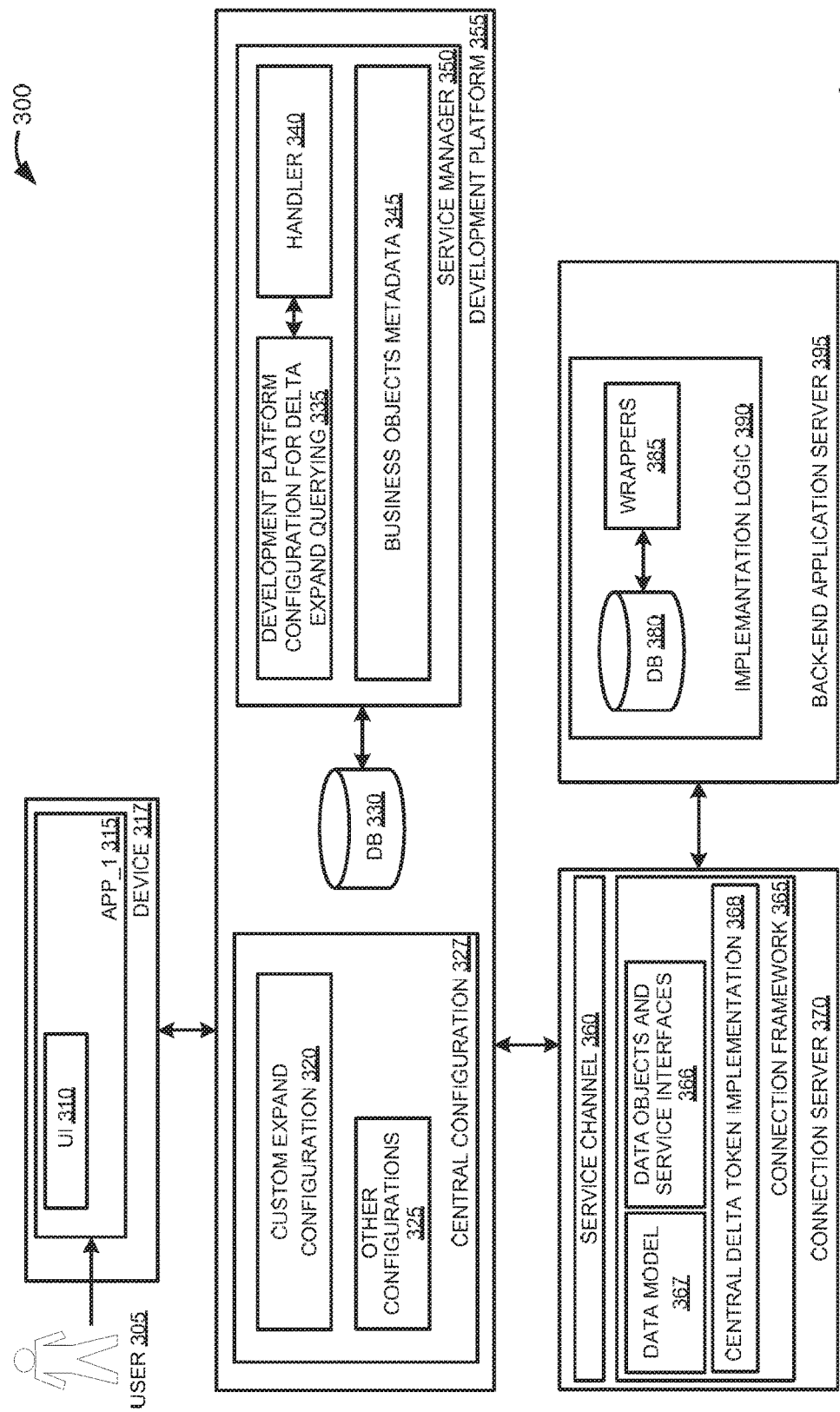
FIG. 3 is a block diagram illustrating an exemplary system environment for providing a delta data expand service, which is delta token enabled, according to one embodiment.

FIG. 3 is a block diagram illustrating an exemplary system environment 300 for providing a delta data expand service, which is delta token enabled, according to one embodiment. A user, such as user 305 communicates with a device 317 and interacts with a UI 310 of an application "App_1" 315. The device 317 may be such as the device 110, FIG. 1. The device 317 may be a mobile device, such as the mobile device 222. The application "App_1" 315 may be an application corresponding to the custom application 115 and custom application 220 from FIG. 1 and FIG. 2. The application "App_1" 315 comprises the UI 310, which may be a GUI and data may be arranged on the UI 310. The presented data through the UI 310 may be data invoked from a back-end application server 395. The back-end application server 395 may correspond to the back-end application server 191 and the back-end application server 290 from FIG. 1 and FIG. 2. The UI 310 may provide options for defining a search for data stored at the back-end application server 395. The searched data may be data, which is related to a defined data entity. For example, a user request may be for data associated with a particular sales order, defined with a sales order number. The data that may be related to the defined sales order with number X. The data related to that sales order (number "X"), may be data related to a business partner that is mentioned on the sales order, data related to the customer associated with that sales order, data related to the products and/or product supplied of the products associated with the sales order. Such association between data may be referred to as expanded or nested data. Such data may be stored in database table in a database on the back-end application server 395. The database may be such as DB 380. The data stored in the database 380 may be invoked and pushed through wrappers 385. The database 380 and the wrappers 385 may be designed according to an implementation logic 390 related to the back-end application server 395. The implementation logic 390 may be defined through different technologies and techniques.

In one embodiment, the user 305 may request data through the UI 310. In one exemplary embodiment, the requested data may be an expanded set of data related to a data entity. In another exemplary embodiment, the requested data may be data related to an initial data load of the application "App_1" 315 for that user 305. The user 305 may authenticate in front of the application "App_1" 315 and when the application recognizes him, an initial data load may be trigger, which is associated with an account of the user. After the request is received at the application "App_1" 315, the application communicates with a development platform 355. The development platform 355 may be a platform that is used for building the application "App_1" 315. The application "App_1" 315 may be coupled to the platform 355 to handle requests associated with consuming services for accessing data from the back-end application server 395. The development platform may correspond to the development platform 125 and the mobile development platform 268 from FIG. 1 and FIG. 2 correspondingly. The development platform 355 includes a central configuration 327 including a custom expand configuration 320 and other configurations 325. The central configuration 327 may correspond to the described configuration 130 discussed in relation to FIG. 1. The central configuration 327 may correspond to the described configurations 230 discussed in relation to FIG. 2. The development platform 355 also includes a service manager 350 including a custom delta service configuration 335, a handler 340, and business object metadata 345. The service manager 350 with the custom service configuration 335, the handler 340, and the business object metadata 345 may correspond to the service manager 140 with custom delta service configuration 145, the handler 150, and the business objects metadata 160 discussed in relation to FIG. 1. The service manager 350 communicates with a DB 330, which may be a local DB for the development platform 355, where data associated with currently received request by the development platform 355 may be maintained for a defined period of time. The central configuration 327 may correspond to the described configuration 130 discussed in relation to FIG. 1. The service manager 350 may correspond to the described service manager 237 discussed in relation to FIG. 2.

In one embodiment, the development platform 355 resends the received request for expanded set of data entities from the user 305 to a connection server 370. The connection server 370 implements and provides a delta data expand service through which data from the back-end application server 395 may be extracted. The connection server 370 may correspond to the connection server 165 discussed in relation to FIG. 1. The connection server 370 includes a service channel 360 and a connection framework 365. The connection framework includes a data model 367, data objects and service interfaces 366, and a custom delta token implementation 368. The custom delta token implementation 368 includes implementation logic for providing an expand data service with delta token enablement. When an initial request for expanded set of data is received from the user 305, then the custom delta token implementation 368 is invoked to prepare delta tokens to be utilized during a subsequent read request associated with the provided expanded set of data. Delta tokens are prepared and define attributes that are associated with the received request, the requestor, and characteristics of the request. The attributes may include a user identifier (ID) for the user 305, a user globally unique ID, details for the scenario of requesting data, a record identification key, a time stamp for the data exchange, a time stamp for the synchronization of the connection server 370 and the back-end application server 395, etc. For a subsequent request, such as a delta expand request for data received from the application "App_1" 315, the connection server 370 may identify that the request is a request for a delta data associated with some updates on the data at the back-end application server 395. The identification of the request by the custom delta token implementation 368 may be performed through communication with the service manager 350 on the development platform 355. The custom delta token implementation 368 communicates with the data objects and service interfaces 366. The custom delta token implementation 368 attaches a delta token, computed on the previous step before the delta request to a response body of the delta expand service. The custom delta service configuration 335 on the service manager 350 identifies the delta tokens provided by the custom delta token implementation 368. The custom delta service configuration 335 on the service manager 350 treats the incoming response from the connection server as a response providing updated set of expanded data, compared to the previously provided expanded set of data. The updated set of expanded data is delta data, which is modified data on the back-end application server 395 and is related to the previously provided expanded set of data and the received request for delta data from the application "App_1" 315.

The custom delta service configuration 335 on the development platform 355 uses the content of the response from the connection server 370, to refresh the provided expanded set of data to the application "App_1" 315, which may already be presented on the device 317. The content presented on the device 317 may only be refreshed and not updated as a whole new set. The refreshed data may include presenting new data stored at the back-end application server 395, which was not provided to the device 317 with an initial data request for the expanded set of data. The refreshed data may include previously presented data from the expanded set of data, which was modified at the back-end application server 395. The modification of the data may happen after the first response from the development platform to the application "App_1" 315, and before a delta expand request for updated data is received at the connection server 370. When the user 305 unregisters his account from the application "App_1" 315, all delta tokens and configurations generated as a result of received requests from the user 305 may be deleted (or flushed) from the connection server 370.

Figure 4:
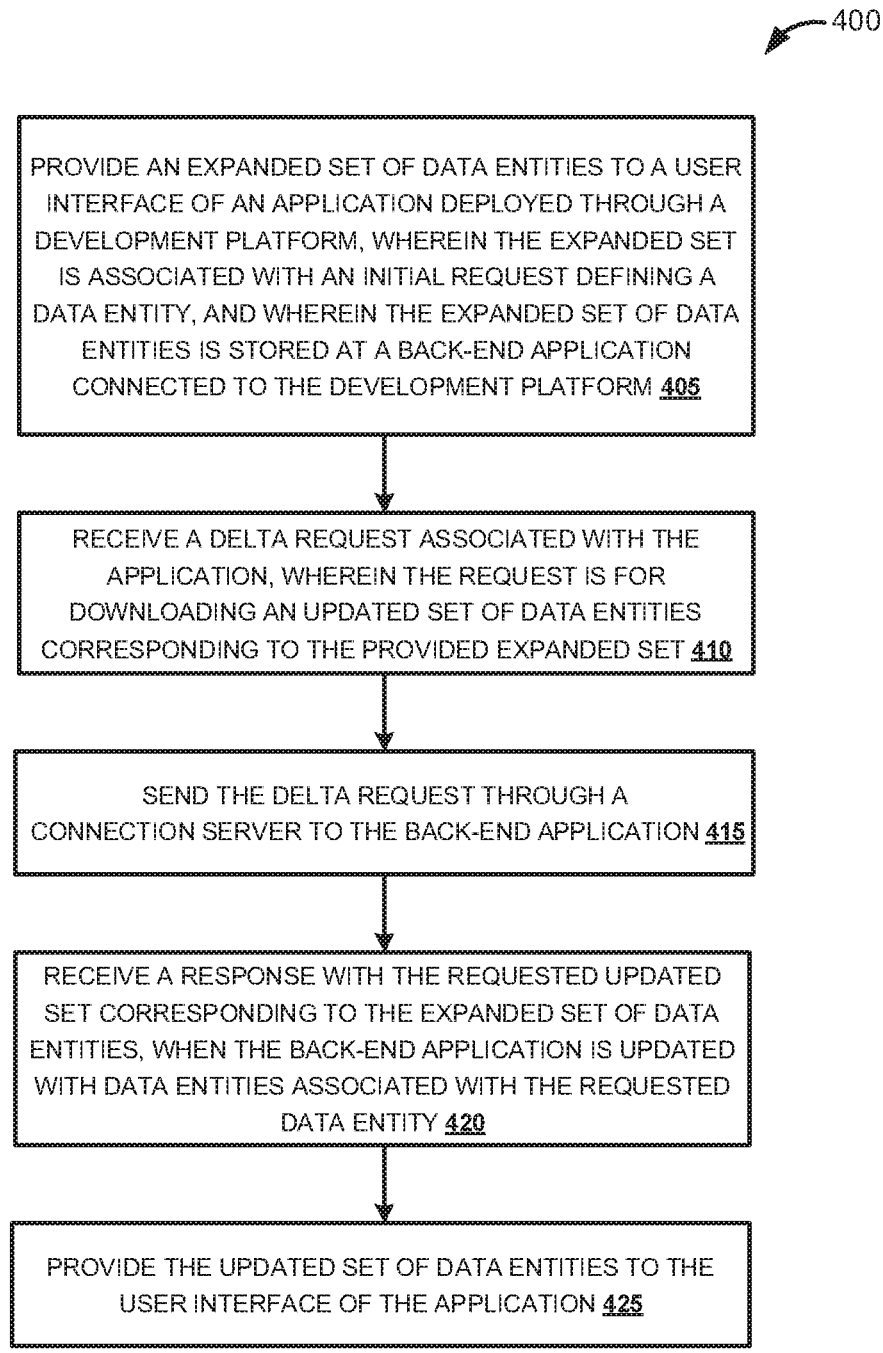
FIG. 4 is a flow diagram illustrating an exemplary process for providing expand services supporting delta querying, according to some embodiments.

FIG. 4 is a flow diagram illustrating a process 400 for providing an expand service supporting delta querying, according to one embodiment. The expand service may be provided for consumption by a user through an application. The expand data service may be associated with data stored at a back-end application. The expand service may be instantiated at a connection server and consumed through invocation by a development platform connected to the application. For example, the application may be a mobile application, which may be built through the development platform. The development platform may handle the communication with the back-end application through a communication server. The communication server may support Open Data Protocol (OData), which is an open protocol allowing the creation and consumption of interoperable application programming interfaces (APIs) for providing restful services. The APIs may be queried and data may be extracted from the back-end application to the user interface of the application. In one embodiment, the expand service may be implemented as a restful service. Representational state transfer (REST) is a software architectural style consisting of a set of components, connectors, and data elements within a distributed system. In systems designed in a restful manner, the focus is on component roles and a specific set of interactions between data elements rather than implementation details.

At 405, an expanded set of data entities is provided to a user interface of the application. The expanded set of data entities may be invoked from a data storage at the back-end application coupled to the application. The application may be deployed on a device through the development platform. The development platform may be mobile development platform for building mobile application to be installed on mobile devices. The provided expanded set of data entities may be provided based on an initial request from the application to the development platform to provide specified data. The development platform is connected to the back-end application. At 410, a delta request is received from the application. The request is for downloading an updated set of data entities corresponding to the provided expanded set of data entities. The back-end application may be updated to include additional data, which data may be associated with the initial request for providing the expanded set of data entities. The initial request defines a data entity. The definition of the data entity may be through searching criteria, and/or a query, and/or a formula with some rules. Based on the update at the back-end side, the application may provide a delta query to the development platform, to invoke the updated set of data entities. At 415, the received delta request at the development platform is sent through the connection server to the back-end application. At 420, a response is received from the connection server. The response may include the requested updated set, corresponding to the expanded set of data entities, when the back-end application is updated with data entities associated with the requested data entity with the initial request. At 425, the updated set of data entities is provided from the development platform to the user interface of the application.

Figure 5:
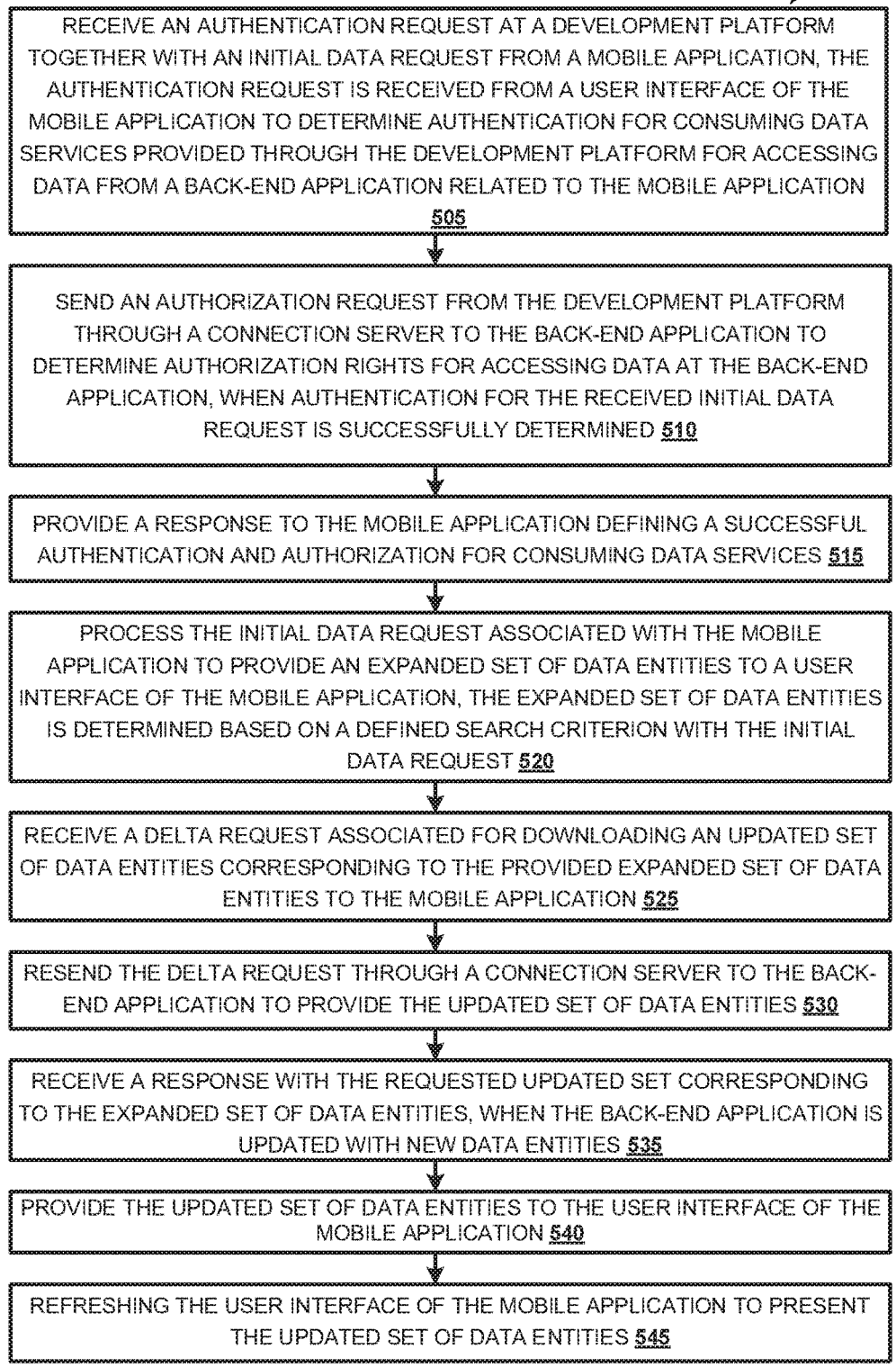
FIG. 5 is a flow diagram illustrating a process for providing an expand service supporting delta querying by a mobile application, according to one embodiment.

FIG. 5 is a flow diagram illustrating a process 500 for providing an expand service supporting delta querying by a mobile application, according to one embodiment. The mobile application is built through a development platform, which may be a mobile development platform. At 505, an authentication request is received at the development platform. The authentication request is received together with an initial data request for the mobile application. The requests are received from a user interface of the mobile application to determine authentication for consuming data services provided through the development platform. The data services may be associated with accessing data from a back-end application, which is related to the mobile application.

At 510, an authorization request from the development platform is sent to the back-end application through a connection server. The authorization request is sent to determine authorization rights for accessing data at the back-end application, which data is requested with the initial data request for the mobile application. At 515, a response is provided to the mobile application. The response defines a successful authentication and authorization for consuming data services. At 520, the initial data request received with the authentication request for the mobile application is processed. The initial data request is processed to provide an expanded set of data entities to a user interface of the mobile application. The expanded set of data entities is determined based on a defined search criterion with the initial data request. At 525, a delta request is received at the development platform. The delta request is associated with the mobile application and is for downloading an updated set of data entities corresponding to the provided expanded set of data entities to the mobile application. At 530, the delta request is resent through a connection server to the back-end application to determine the updated set of data entities. At 535, a response is received at the development platform, the response includes the requested updated set corresponding to the expanded set of data entities, when the back-end application is updated with new data entities. At 540, the UI of the mobile application is provided with the updated set of data entities. At 545, the UI is refreshed to present the updated set of data entities. The updated set of data entities is presented in addition to the expanded set of data entities, which is already presented on the UI.

FIGS. 6A, 6B, 6C, and 6D are flow diagrams illustrating processes 600, 630, 650, and 670 correspondingly, for communication between a mobile application and a back-end application through a connection server providing delta expand services, according to one embodiment. The discussed user, application, development platform, connection server, and back-end application at FIGS. 6A, 6B, 6C, and 6D may be corresponding to the discussed user, application, development platform, connection server, and back-end application at FIGS. 1, 2, 3, 4, and 5.

Figure 6A:
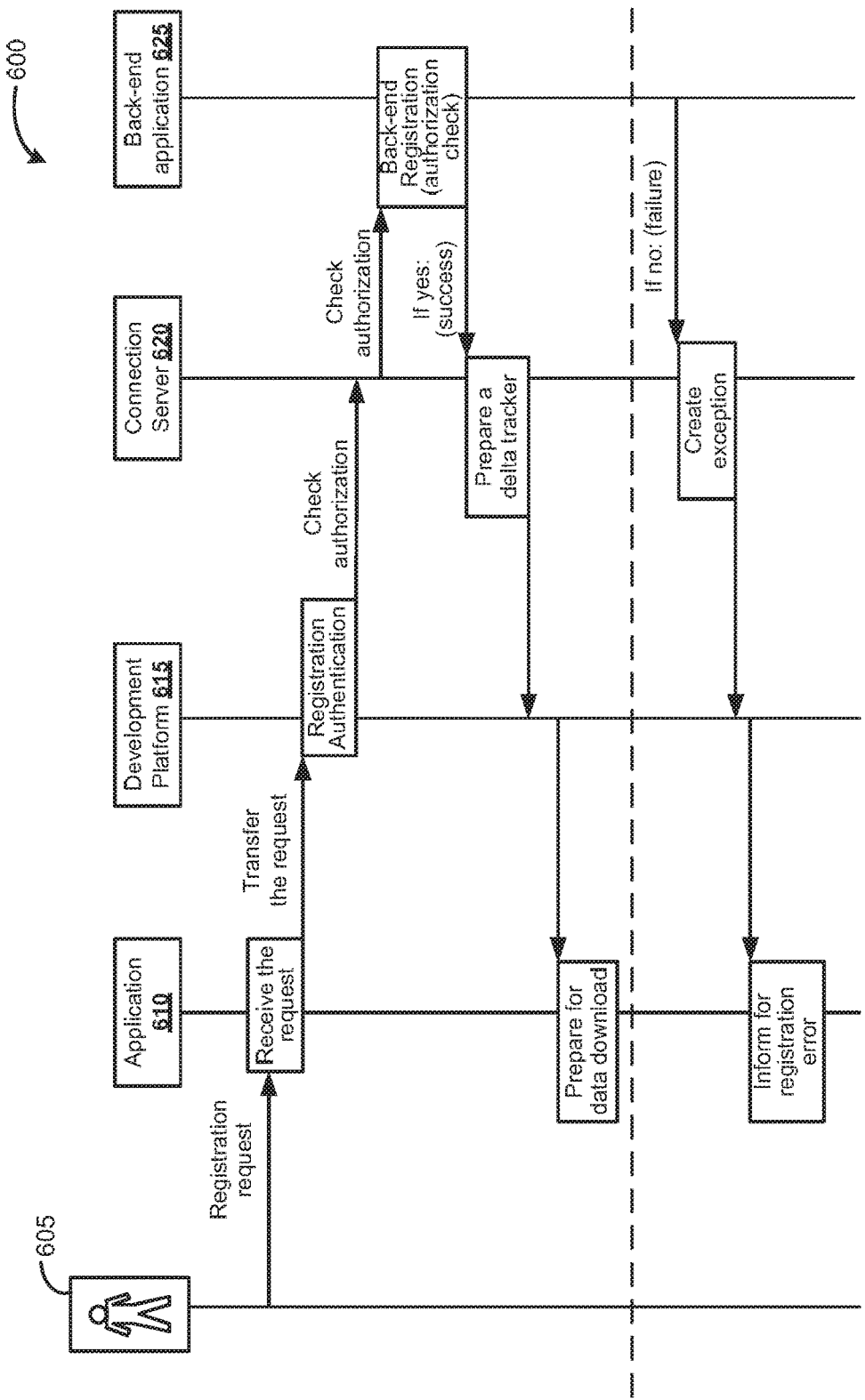
FIG. 6A is a flow diagram illustrating a registration process of a user with a mobile application associated with a back-end application, according to one embodiment.

FIG. 6A is a flow diagram illustrating a registration process 600 of a user with a mobile application associated with a back-end application, according to one embodiment. At process 600, a user 605 sends a registration request to the application 610. The registration request may include provided credential information for an account defined for the user 605. The application 610 receives the request and transfers the request to a development platform 615. The development platform 615 performs authentication of the registration request to determine the authentication rights associated with the received request for the user 605. The development platform sends a request to the connection server 620 to perform a check on authorization for the request in relation to accessing data from a back-end application, which may be connected to. The connection server 620 resends the authorization check to the back-end application 625. The back-end application 625 performed a back-end registration through performing an authorization check for the user 605. The authorization check determined whether the user 605 is allowed to access resources on the back-end application through the application 610 based on credentials provided with the registration request. If the back-end registration is performed successfully, then the connection server 620 prepares a delta tracker. The delta tracker may be such as the delta token generated by the custom delta token implementation 368 on the connection server 370 on FIG. 3. When the delta tracker is prepared, the application 610 is available for request to provide download services for data from the back-end application 625 to the user 605. If the back-end registration at the back-end application 625 is not performed successfully and the user 605 is not authorized to access resources from the back-end application 625, then the connection server 620 may create an exception and inform application 610 about the authentication failure through the development platform 615. The application 610 informs the user 605 that there is a registration error for the received registration request.

FIG. 6B is a flow diagram illustrating a process for initial data download 630 for a mobile application related to a back-end application through a connection server, which is providing delta expand services, according to one embodiment. At process 630, a user 631 triggers an initial data download through an application 635. In one embodiment, the user 631 may be such as the user 605, and the user 605 may be authenticated and authorized to download data from a back-end application 645. For example, the user 631 may have send a registration request such as the one described at process 600, FIG. 6A. The initial data download request may be a request for a data entity, and/or a set of data entities that are associated and have a defined relationship between each other. The initial data download request may be for an expanded set of data related to a data entity. The data entity may be defined by the user 631, and for example may be an account associated with the user 631 and the application 635. In such a manner, the initial data may be defined to be provided by the application 635 to the user 631. The application 635 transfers the initial data download request to the development platform 637. The development platform 637 starts to perform a delta tracker check, to determine whether previous requests associated with the initial data download request are served by the application 635. The development platform 637 checks delta trackers through communication with a connection server 640. The connection tracker may determine that there are no delta trackers generated so far, as this is an initial data download request. The connection server 640 may send a request for full data fetch from the back-end application 645.

If the full data fetch may be successfully performed by the back-end application 645, then the back-end application 645 informs the connection server 640 about the success and passes the data. The connection server 640 updates delta trackers and provides a successful response to the development platform 637. The development platform 637 checks the delta trackers and adapts a response based on configurations for providing the received data from the back-end application 645. The development platform 637 sends the passed data from the back-end application 645 to the application 635. The application 635 loads a UI screen with the fetched data for the triggered initial data download. If the full data fetch may not be performed by the back-end application 645, then the back-end application 645 informs the connection server 640 about the failure, and the connection server 640 triggers an exception. The connection server 640 communicates the exception to the development platform 637 and the development platform 637 ignores the tracking of delta data and delta trackers, as no data will be transferred from the back-end application 645 to the application 635. The application 635 informs the user 631 for the data download failure.

FIG. 6C is a flow diagram illustrating a process 650 for delta data requests between a mobile application and a back-end application through a connection server, which provides delta expand services, according to one embodiment. At process 650, a user 651 sends a request for download of updated data to an application 652. The updated data may be delta expanded set of data associated with a previously provided data to the user 651 through the application 652. The application 652 received the request and resends the request to a development platform 655. The development platform 655 may be such as the development platform 637, FIG. 6B. The development platform 655 checks delta trackers from a connection server, to determine whether there are generated delta trackers at the connection server 660 for previously served requests for the user 651, related to the update request. The connection server 660 performs a check on the existence of delta trackers and reads the information stored in the delta tracker. The connection server 660 requests from a back-end application 665 to read delta data, as defined in the update request. The updated data is determined by the back-end application 665 and a response is provided to the connection server 660. The response may define that the fetching of updated data is successfully performed and the response includes the fetched updated data. The response may define that the fetching of updated data is unsuccessfully performed and the response includes a failure notification.

If the fetched data is provided with the response, then the connection server 660 received the passed data, and updates a delta tracker. The delta tracker is updated to include information about the performance of the delta data, and information about the event. The information defined in the attributes of a delta tracker may be corresponding to discussed attributes for a delta token in relation to FIG. 3. The connection server 660 passed the fetched updated data to the development platform 655. The development platform 655 checks the deltas and adapts a response based on configuration. The configuration may be such as a custom expand configuration corresponding to the custom expand configuration 132, FIG. 1. The development platform 655 communicates with the application 652 to provide the fetched updated data. The application 652 updates the changed loaded data on the UI with the fetched updated data. In such manner, the data on the loaded UI is refreshed to include the fetched updated data and the previously presented data on the UI is not reloaded for presentation again. If the fetching of updated data by the back-end application 665 is unsuccessful, then the back-end application 665 communicates with the connection server 660 and the connection server 660 triggers an exception. The exception is sent to the development platform 655. The development platform 655 ignores the generated deltas. The exception is raised to the application 652. The application 652 informs on the UI that there is a data download failure.

Figure 6D:
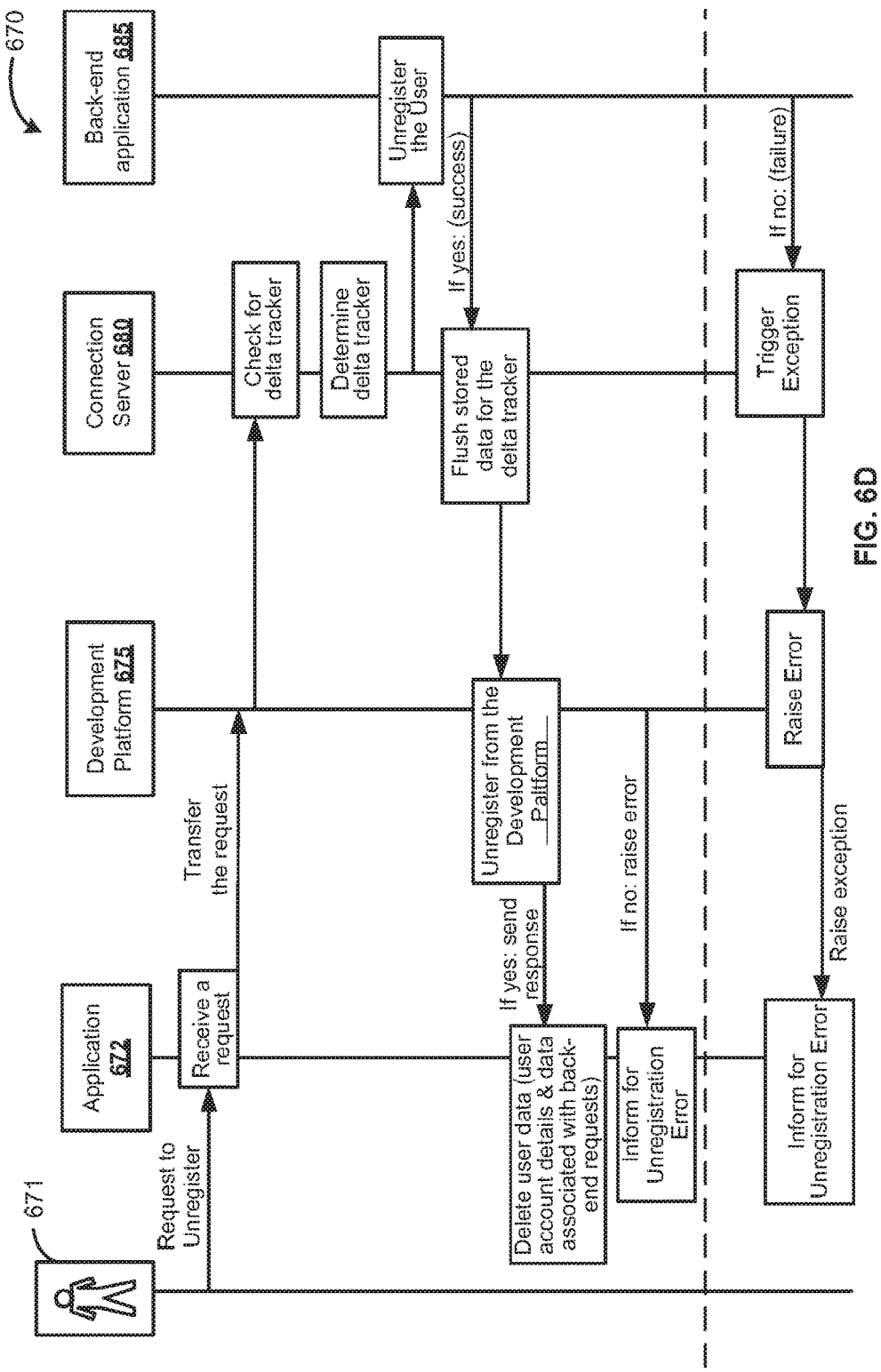
FIG. 6D is a flow diagram illustrating a process for unregistration of a user from a mobile application for accessing data at a back-end application through a connection server, according to one embodiment.

FIG. 6D is a flow diagram illustrating a process 670 for unregistration of a user from a mobile application for accessing data at a back-end application through a connection server, according to one embodiment. At process 670, a user 671 sends a request to unregister from an application 672. The request may be sent after the user 671 has sent a request to register with the application 672 and has performed data requests. The user 671 may be such as user 605, FIG. 6A, user 631, FIG. 6B, user 651. FIG. 6C. The application 672 receives the request and transfers it to a development platform 675. The development platform 675 communicates the request to a connection server 680. The connection server 680 checks for existing delta trackers at the connection server. Such delta trackers may be generated as suggested in FIG. 6B and FIG. 6C. The connection server 680 determines whether an existing delta tracker is associated with the user 671 and the application 672. The connection server 680 sends a request to the back-end application 685 to unregister the user 671. If the un-registration is performed successfully, then the back-end application 685 communicates with the connection server 680 to inform for the success and the connection server 680 flushed stored data for the determined delta trackers. The connection server 680 communicates with the development platform 675 to request un-registration of the user from the development platform 675. The development platform 675 sends a response. If the un-registration from the development platform 675 is performed successfully, then the application 672 is notified and data associated with the user is deleted from the application 672. The deleted data associated with the user includes data associated with an account of the user and data associated with back-end application server requests. If the un-registration fails, then the application 672 is informed about the error and the application 672 informs the user 671 for the error. If the un-registration fails at the back-end application 685, then an exception is triggered at the connection server 680, and the error is raised to the development platform 675. The raised exception is communicated to the application 672 and the error is provided on the UI of the application 672 to inform the user 671 for the failure.

Figure 7:
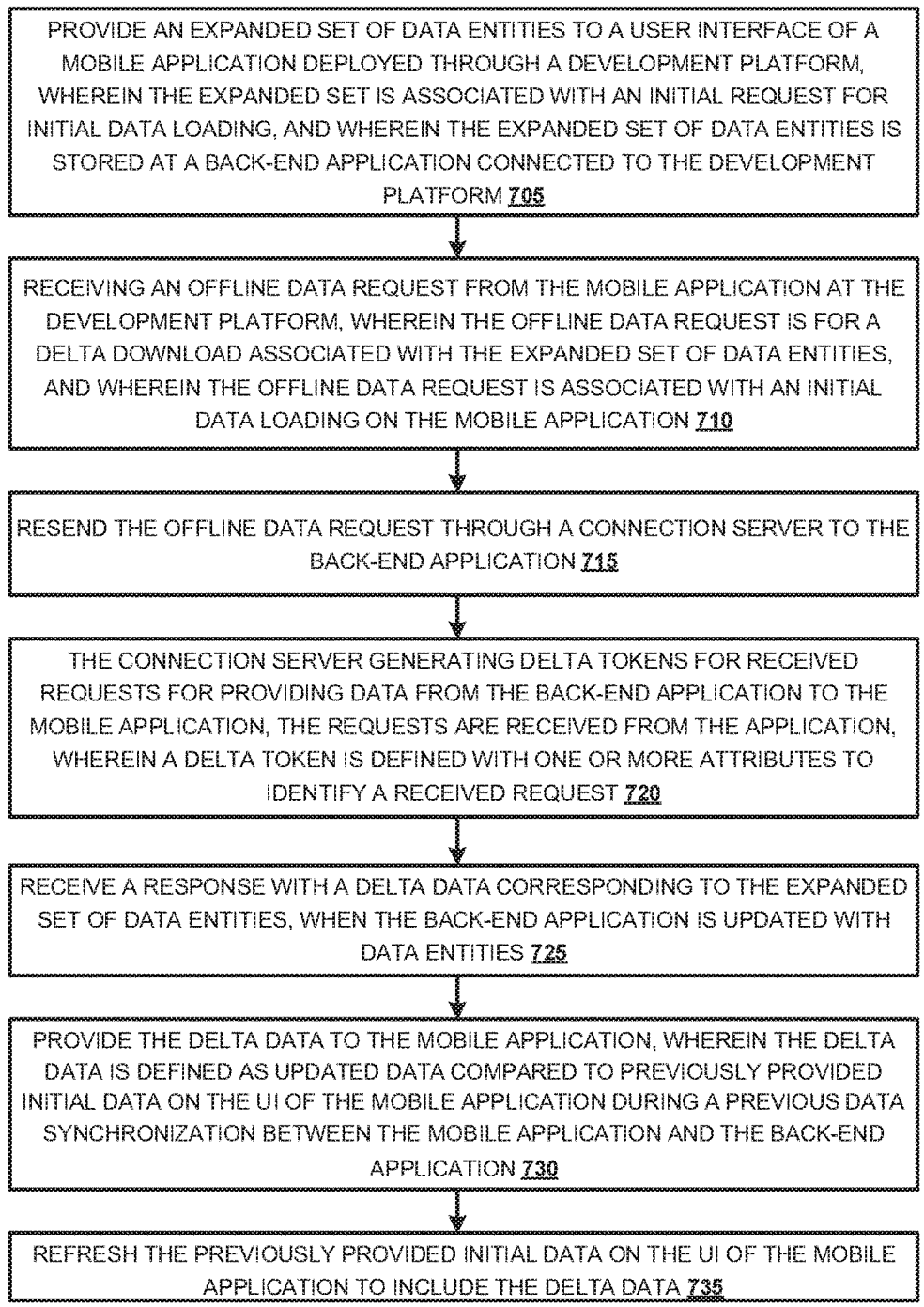
FIG. 7 is a flow diagram illustrating a process for providing an expand service providing delta querying by a mobile application during initial data loading, according to one embodiment.

FIG. 7 is a flow diagram illustrating a process for providing an expand service providing delta querying by a mobile application during initial data loading, according to one embodiment. At 705, an expanded set of data entities is provided to a UI of a mobile application. The expanded set of data entities may be provided as a result from a received initial request for initial data loading of the mobile application. The mobile application may be deployed through a development platform. The mobile application may be installed on a mobile device and establish remote connections with the development platform. The expanded set of data entities is stored at a back-end application connected to the development platform. The expanded set of data entities may be provided during an online mode of the mobile application. The expanded set of data entities may be requested through the mobile application while the mobile application is in an offline mode. When the mobile application enters into an online mode, the provided request is transferred from the mobile application to the development platform.

At 710, an offline data request is received from the mobile application at the development platform. The offline data request is for a delta download associated with the provided expanded set of data entities and an initial request for initial data loading on the mobile application. The offline data request is received from the development platform, when the mobile application becomes in an online mode and a connection between the mobile application and the development platform may be established. The offline data request may be created by a user, interacting with the UI of the mobile application. The offline data request may be created, while the mobile application is not connected to a network and is in an offline mode. For example, a user may request to refresh the data provided on the UI of the mobile application for a subsequent active mode of the mobile application.

At 715, the offline data request is resent through a connection server to the back-end application. At 720, the connection server generates delta tokens for received requests for providing data from the back-end application to the mobile application. A delta token may be mapped to a particular request from an identified user account. The delta token is defined with one or more attributes to identify a received request. The delta tokens may be used to determine whether delta synchronization between the mobile application and the back-end application is successfully or unsuccessfully performed. At 725, a response is received at the development platform with a delta data corresponding to the expanded set of data entities, as provided at 705. The delta data is provided to the development platform, when the back-end application is updated with data entities. The updated data on the back-end application may be associated with the data from the initial data loading for the mobile application. Therefore, a delta data is persisted at the back-end application and is determined when the connection server request data, as defined with the offline data request.

At 730, the delta data is provided to the mobile application. The delta data is defined as updated data compared to previously provided initial data on the UI of the mobile application during a previous data synchronization between the mobile application and the back-end application. At 735, the previously provided initial data on the UI of the mobile application is refreshed to include the delta data.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 8:
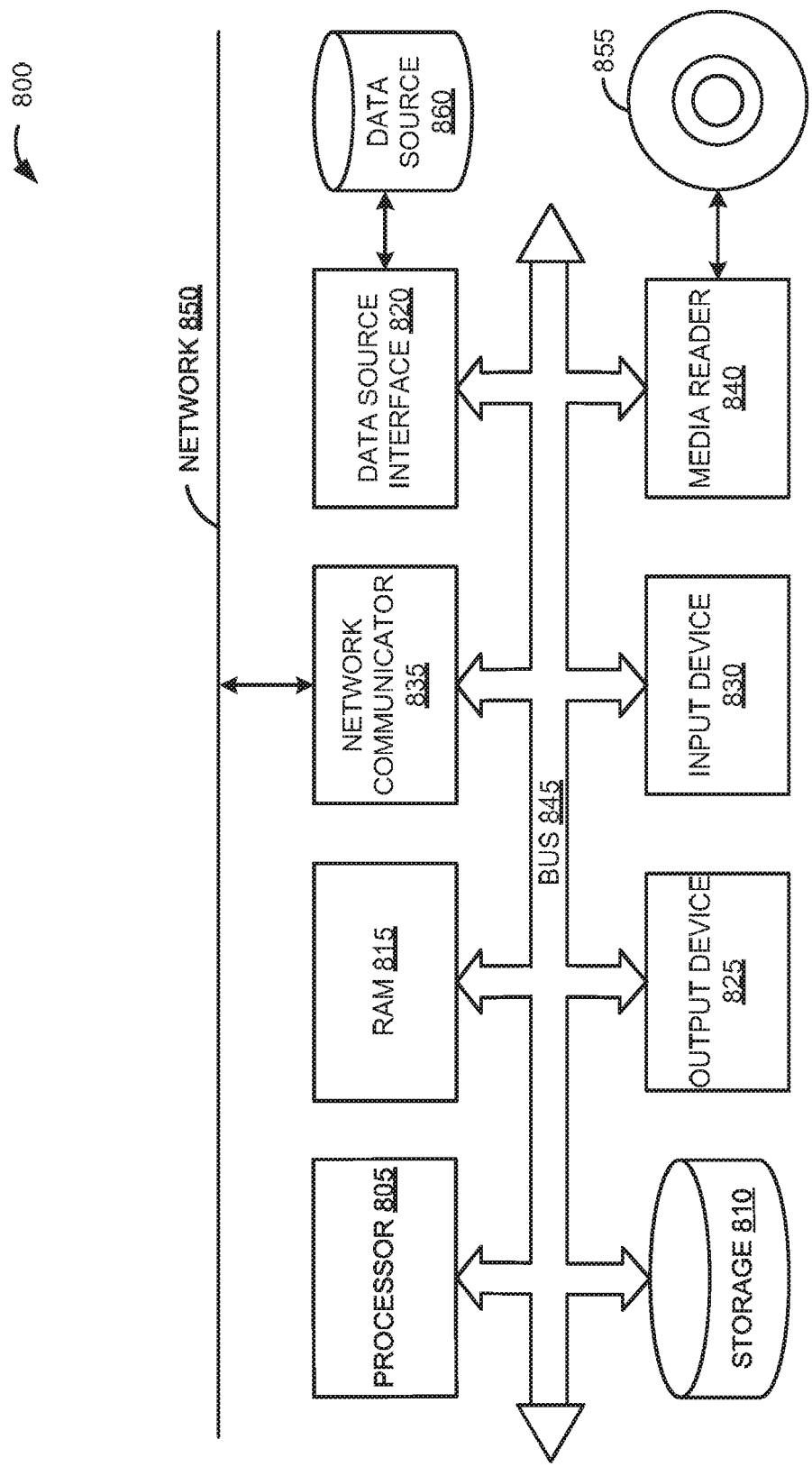
FIG. 8 is a block diagram illustrating an embodiment of a computing environment in which the techniques described for providing expand services supporting delta querying can be implemented.

FIG. 8 is a block diagram of an exemplary computer system 800. The computer system 800 includes a processor 805 that executes software instructions or code stored on a computer readable storage medium 855 to perform the above-illustrated methods. The processor 805 can include a plurality of cores. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. According to some embodiments, such as some in-memory computing system embodiments, the RAM 815 can have sufficient storage capacity to store much of the data required for processing in the RAM 815 instead of in the storage 810. In some embodiments, all of the data required for processing may be stored in the RAM 815. The stored instructions may be further compiled to generate other representations of the instructions and dynamically stored in the RAM 815. The processor 805 reads instructions from the RAM 815 and performs actions as instructed. According to one embodiment, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope of the one or more embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to provide expanding data services, the method comprising:
providing an expanded set of data entities to a user interface of an application deployed through a development platform, wherein the expanded set of data entities is associated with a defined data entity in an initial request for the expanded set of data entities associated with the defined data entity, wherein the initial request defines the data entity, and wherein the association between the defined data entity and the expanded set of data entities is nested and the expanded set of data entities is stored together with the defined data entity at a back-end application connected to the development platform;
generating a delta token at a delta token generator of a connection server in response to the initial request for the expanded set of data entities, wherein the delta token defines attributes associated with the received request, the requestor, and characteristics of the request;
maintaining the generated delta token at the delta token generator until a delta request associated with the application is received;
receiving the delta request associated with the application, wherein the request is for downloading an updated set of data entities for the provided expanded set;
attaching the delta token to the delta request at the connection server;
sending the delta request through the connection server to the back-end application;
receiving a response to the delta request, the response comprising the requested updated set of data entities, when the back-end application is updated with data entities associated with the initial request; and
providing the updated set of data entities to the user interface of the application.

2. The method of claim 1, wherein the initial request includes a searching criterion for determining data entities associated with the defined data entity with the initial request.

3. The method of claim 2, wherein the expanded set of data entities is stored in one or more database tables at the back-end application, wherein the defined data entity with the initial request is related to entities from the expanded set of data entities.

4. The method of claim 1, wherein the updated set of data entities includes changed, updated and modified data entities related to the defined data entity from the initial request, wherein the changed, updated and modified data entities are generated after an update on the back-end application that occurs after the expanded set of data entities are provided in response to the initial request and before the delta request is received.

5. The method of claim 4, further comprising:
refreshing the user interface of the application to present the updated set of data entities in addition to already presented data including the expanded set of data entities.

6. The method of claim 1, further comprising:
receiving an authentication request associated with the received delta request, the authentication request is received from the user interface of the application to determine authentication for consuming services providing through the development platform for accessing data from the back-end application.

7. The method of claim 6, further comprising:
sending an authorization request from the development platform through the connection server to the back-end application to determine authorization rights for accessing data at the back-end application for the received delta request, when authentication for the received delta request for accessing data from the back-end application is successfully determined.

8. The method of claim 1 wherein:
the connection server generates the delta tokens for received requests for providing data from the back-end application, the requests are received from the application, wherein the delta token is defined with one or more attributes to identify a received request and determine whether delta synchronization between the application and the back-end application is successfully performed.

9. The method of claim 1, wherein the application is a mobile application installed on a device, and wherein the application establishes a remote connection with the development platform to access data from the back-end application.

10. The method of claim 9, further comprising:
receiving an offline data request from the mobile application at the development platform, wherein the offline data request is created when the mobile application is in an offline mode, and wherein the offline data request is associated with an initial data loading on the mobile application in relation to a defined authenticated user;
providing a delta data to the mobile application, wherein the delta data is defined as updated data compared to previously provided initial data on the mobile application during a previous data synchronization between the mobile application and the back-end application; and
refreshing the previously provided initial data on the user interface of the application to include the updated data without reloading the previously provided initial data.

11. The method of claim 1, wherein the expanded set of data entities is provided via a wrapper designed according to an implementation logic related to the back-end application server.

12. The method of claim 1, wherein the development platform includes a custom expand configuration to execute requests for providing expanded data persisted at the back-end application server and a custom delta service configuration defined for an instantiated delta expand data service for providing expanded data and providing delta updates for the expanded data.

13. A computer system to determine a plurality of clusters for a set of objects, comprising:
a processor;
a memory in association with the processor storing instructions related to:
provide an expanded set of data entities to a user interface of an application deployed through a development platform, wherein the expanded set of data entities is associated with a defined data entity in an initial request for the expanded set of data entities associated with the defined data entity, wherein the initial request defines the data entity, and wherein the association between the defined data entity and the expanded set of data entities is nested and the expanded set of data entities is stored together with the defined data entity at a back-end application connected to the development platform;
generate a delta token at a delta token generator of a connection server in response to the initial request for the expanded set of data entities, wherein the delta token defines attributes associated with the received request, the requestor, and characteristics of the request;
maintain the generated delta token at the delta token generator until a delta token request associated with the application is received;
receive the delta request associated with the application, wherein the request is for downloading an updated set of data entities for the provided expanded set;
attach the delta token to the delta request at the connection server;
send the delta request through the connection server to the back-end application;
receive a response to the delta request, the response comprising the requested updated set of data entities, when the back-end application is updated with data entities associated with the initial request; and
provide the updated set of data entities to the user interface of the application.

14. The system of claim 13, wherein the memory further stores instructions to:
refresh the user interface of the application to present the updated set of data entities in addition to already presented data including the expanded set of data entities.

15. The system of claim 13, wherein the initial request includes a searching criterion for determining the expanded set of data entities to include data entities associated with the defined data entity with the initial request, and wherein the expanded set of data entities is stored in one or more database tables at the back-end application, and wherein the updated set of data entities includes changed, updated and modified data entities related to the defined data entity from the initial request, wherein the changed, updated and modified data entities are generated after the updated of the back-end application.

16. The system of claim 15, wherein the memory further stores instructions to:
receive an authentication request associated with the received delta request, the authentication request is received from the user interface of the application to determine authentication for consuming services providing through the development platform for accessing data from the back-end application.

17. The system of claim 15, wherein the memory further stores instructions to:
send an authorization request from the development platform through the connection server to the back-end application to determine authorization rights for accessing data at the back-end application for the received delta request, when authentication for the received delta request for accessing data from the back-end application is successfully determined.

18. The system of claim 13, wherein the memory further stores instructions to:
the connection server, generate delta tokens for received requests for providing data from the back-end application, the requests are received from the application,
wherein a delta token is defined with one or more attributes to identify a received request and determine whether delta synchronization between the application and the back-end application is successfully performed.

19. A non-transitory computer-readable medium storing instructions, which when executed cause a computer system to perform operations comprising:
providing an expanded set of data entities to a user interface of an application deployed through a development platform, wherein the expanded set of data entities is associated with a defined data entity in an initial request for the expanded set of data entities associated with the defined data entity, wherein the initial request defines the data entity and wherein the association between the defined data entity and the expanded set of data entities is nested and the expanded set of data entities is stored together with the defined data entity at a back-end application connected to the development platform;
generating a delta token at a delta token generator of a connection server in response to the initial request for the expanded set of data entities, wherein the delta token defines attributes associated with the received request, the requestor, and characteristics of the request;

maintaining the generated delta token at the delta token generator until a delta request associated with the application is received;

receiving the delta request associated with the application, wherein the request is for downloading an updated set of data entities for the provided expanded set;

attaching the delta token to the delta request at the connection server;

sending the delta request through the connection server to the back-end application;

receiving a response to the delta request, the response comprising the requested updated set of data entities, when the back-end application is updated with data entities associated with the initial request; and providing the updated set of data entities to the user interface of the application.

20. The computer-readable medium of claim 19, wherein the initial request includes a searching criterion for determining the expanded set of data entities to include data entities associated with the defined data entity with the initial request, and wherein the expanded set of data entities is stored in one or more database tables at the back-end application, and wherein the updated set of data entities includes changed, updated and modified data entities related to the defined data entity from the initial request, wherein the changed, updated and modified data entities are generated after the updated of the back-end application.

21. The computer-readable medium of claim 20, further comprising instructions, which when executed cause the computer system to perform operations comprising:

receiving an authentication request associated with the received delta request, the authentication request is received from the user interface of the application to determine authentication for consuming services providing through the development platform for accessing data from the back-end application; and sending an authorization request from the development platform through the connection server to the back-end application to determine authorization rights for accessing data at the back-end application for the received delta request, when authentication for the received delta request for accessing data from the back-end application is successfully determined.

22. The computer-readable medium of claim 19, further comprising instructions, which when executed cause the computer system to perform operations comprising:

the connection server, generating delta tokens for received requests for providing data from the back-end application, the requests are received from the application, wherein a delta token is defined with one or more attributes to identify a received request and determine whether delta synchronization between the application and the back-end application is successfully performed.

\* \* \* \* \*